United States Patent
Nishikawa et al.

[11] Patent Number: 5,129,011
[45] Date of Patent: Jul. 7, 1992

[54] METHOD AND APPARATUS FOR RETRIEVING IMAGE DATA

[75] Inventors: Kenichi Nishikawa, Yokohama; Yasuo Kurosu, Yokosuka; Seiichi Kanema, Yokohama; Hajime Uchiyama; Masahiro Okumura, both of Odawara; Masaaki Fujinawa, Tokyo; Naoaki Kubushiro, Minamiashigara; Hirowo Shimizu, Kumagaya, all of Japan

[73] Assignee: Hitachi, Ltd., Tokyo, Japan

[21] Appl. No.: 468,693

[22] Filed: Jan. 23, 1990

[30] Foreign Application Priority Data

Jan. 25, 1989 [JP] Japan .................. 1-13901

[51] Int. Cl.$^5$ .................. G06K 9/34; G06K 9/36; G06K 9/46; G09G 1/06
[52] U.S. Cl. .................. 382/9; 382/56; 340/723; 364/225.4
[58] Field of Search ........... 382/56, 9, 1, 41; 340/723, 731, 717; 364/225.4, 246.3, 254.3

[56] References Cited

U.S. PATENT DOCUMENTS

| | | | |
|---|---|---|---|
| Re. 33,316 | 8/1990 | Katsuta et al. | 382/56 |
| 4,368,485 | 1/1983 | Midland | 340/717 |
| 4,451,895 | 5/1984 | Sliwkowski | 340/717 |
| 4,716,404 | 12/1987 | Tabata et al. | 340/723 |
| 4,760,388 | 7/1988 | Tatsumi et al. | 340/717 |
| 4,808,987 | 2/1989 | Takeda et al. | 340/723 |
| 4,845,480 | 7/1989 | Satou | 340/717 |
| 4,918,588 | 4/1990 | Barrett et al. | 364/200 |
| 4,992,887 | 2/1991 | Aragaki | 358/403 |
| 5,010,581 | 4/1991 | Kanno | 382/56 |

Primary Examiner—Michael Razavi
Assistant Examiner—Michael Cammarata
Attorney, Agent, or Firm—Antonelli, Terry, Stout & Kraus

[57] ABSTRACT

A filing method and a system for filing image data operate to divide an input image having a dot number larger than a predetermined dot number of a display screen at a fundamental unit equal to the display screen size, to file the divided input images as a plurality of partial image data on an optical disk, and to retrieve the filed images at high speed. The division filing system includes an input image process device for compressing the divided partial image data, and an index generating device, such as a complexity detecting circuit, for extracting either position information of a distinguishable partial image, or address information among the divided partial images. An optical disk device stores either the position information or the address information as well as the compressed image data into an optical disk. The image retrieval process sequentially reads the compressed image data of only the distinguishable particular image from the optical disk, while referring the address information or the position information image.

21 Claims, 10 Drawing Sheets

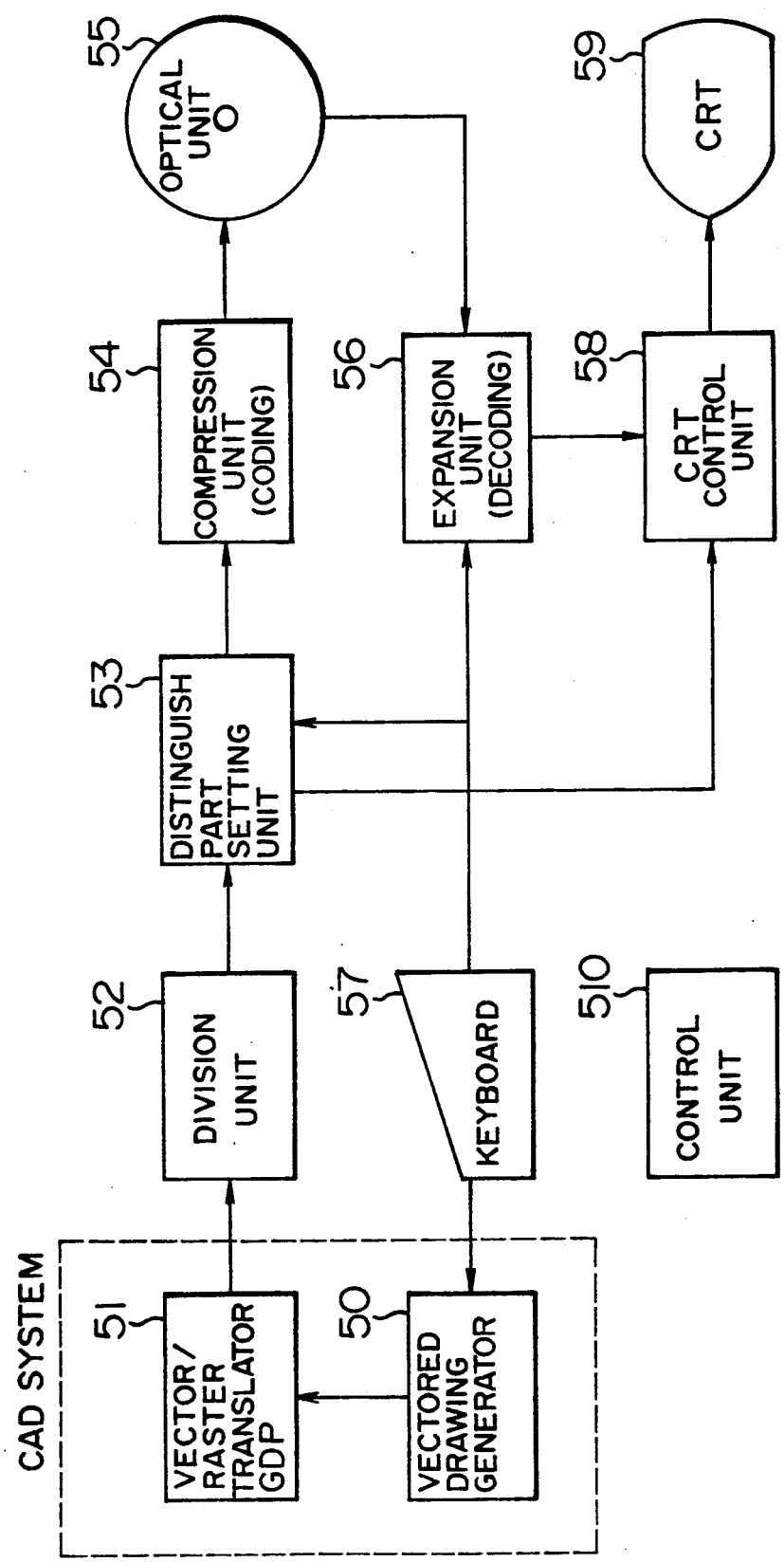
F I G. 5

METHOD AND APPARATUS FOR RETRIEVING IMAGE DATA

CROSS-REFERENCE TO RELATED APPLICATIONS

The present invention relates to U.S. application Ser. No. 469,383 filed on Jan. 24, 1990, by Yasuo Kurosu et al based on Japanese Patent Application No. 1-16146 filed Jan. 27, 1989; U.S. application Ser. No. 480,667 filed on Feb. 15, 1990, by Yoshihiro Yokoyama et al based on Japanese Patent Application No. 1-63625 filed Mar. 17, 1989, and relates to Japanese Patent Application No. 1-63624 filed by Hitachi Limited on Mar. 17, 1989.

BACKGROUND OF THE INVENTION

The present invention relates to a processing technique for image data in an electronic filing apparatus for use with an optical disk and the like. In particular, the present invention is directed to a divisional file method and a system for the image data used to realize high speed retrieving of a large-sized drawing and the like by referring to the image itself on an image display apparatus.

Recently, image file apparati have been practically utilized, and various retrieval systems thereof have been studied. As is known, a method for displaying an image for retrieval is very useful when image data is retrieved, since such a method can make a direct appeal to an operator, as compared with another retrieval method by way of a keyword and the like.

In general, a display screen of an image file apparatus has been standardized with the CCITT protocols. for instance, an original-sized display of an A4 size is fixed to 200 dots/inch (DPI). To the contrary, a size of an image to be handled is different such that a document size is from A0 to A3. More specifically, in the case where a data capacity (A0 to A3) of a document is larger than the screen capacity (standard in A4) of a display apparatus, an entire image cannot be displayed without further processing. Then, while an image is inputted, when an image having a display dot number greater than that of a screen of a display apparatus is inputted, a guide image is formed by uniformly reducing the entire image so as to fit this image to the screen of the display apparatus, and the guide image is read out and displayed during the retrieving operation to retrieve the desired image.

However, when a large-sized source image such as an A0 and A1-sized drawing is uniformly reduced so as to be fitted with a screen having the normal A4 size. In recording the image on a recording medium, such as an optical disk, the image is compressed due to the thinned-out operation affected during the reduction, and there is a problem that a distinguishing part of each image cannot be judged for legibility in reproduction.

Accordingly, one conventional method as described in JP-A-60-10771 has been proposed to solve the above-mentioned problem.

In accordance with this conventional method, when a source or original image is inputted into an optical disk device of a file apparatus, an operator selectively extracts an arbitrary partial image from the source image so as to form it as a guide image, and stores it together with the source image into the optical disk. Then, in a retrieval operation, the guide image within the optical disk is read out, and the guide images are successively and continuously displayed on a display screen so that a desired image is retrieved. When the desired image can be found from the displayed guide images, the source image corresponding to the guide image in concern is read out and then the retrieval operation is accomplished.

In accordance with the above-mentioned prior art, since the distinguishing part of the source image can be observed at a glance, whereby an operator can immediately specify the source image, a retrieval can be realized in which convenient-to-use images are successively displayed to realize retrieval based on the contents thereof.

In the above-mentioned prior art, since the guide images are separately formed with respect to the source images and stored together with the source images in the image storage device, such as an optical disk, an extra file capacity for storing such guide images is required. Generally, since the amount of data in an image is large, the extra file capacity becomes large. In particular, when a plurality of guide images are formed with respect to each source image, the required file capacity becomes large. As a result, the number of images which can be stored in an optical disk for providing the file capacity is reduced.

In the case where, for instance, a ⅛ partial image of a source image is extracted therefrom so as to form a single guide image, image data is increased by 12.5% of that of the source image.

Further, if a source image cannot be specified by a guide image, the source image must be specified by observing a partial image other than the guide image of the source image. However, according to the conventional method, the partial image except for the guide image must be observed by reading the source image so as to display this source image. However, at this time, if compressed data of a source image having a large size such as A0 and A1 sizes are read out from the optical disk and expanded into image data so as to be displayed on a screen, there occurs an inconvenience that the display speed is lowered. For example, a time required for reading from the optical disk, compressed data obtained by compressing image data on an image having an A0 size and for expanding the compressed data so as to produce the image data, is consumed 16 times longer than that required for an image having an A4 size. As a consequence, the time required for displaying an entire image having the A0 size on the screen becomes much longer than that for displaying an image having the A4 size, and therefore the machine interface is considerably deteriorated.

In U.S. Pat. No. 4,716,404 issued on Dec. 29, 1987, assigned to the present assignee, a method has been proposed in which a distinguishing part of the source image as a guide image is combined with memorandum information to perform the image retrieval operation. However, no reference is made to performing the file process of a source image having a large size.

Furthermore, the memorandum image forming technique has been disclosed in U.S. Pat. No. 4,808,987 issued on Feb. 28, 1989 assigned to the present assignee.

SUMMARY OF THE INVENTION

An object of the present invention is to provide an image filing method and an apparatus capable of filing an image having a large size, such as a design drawing, multiplied by a standard display dimension while suppressing a file capacity to a minimum value, and also capable of retrieving the image at high speed.

Another object of the present invention is to provide a method and a system in which when an image having a large size such as an A0-sized drawing and an A1-sized drawing is handled, convenient-to-use images are successively displayed on a display screen at high speed without requiring an extra file capacity, and a retrieval operation is realized based on contents of the displayed images.

A still further object of the present invention is to provide an image data store medium for use with a filing system, which includes a data control region for independently storing either position information on a distinguishing part of an input image, or display priority information thereof in connection with each image data, as well as an image data region to file the input image in the form of a plurality of partial images formed by dividing the input image into a unit image size.

To achieve the above objects, according to one feature of the present invention, after an input image having a dot number larger than a predetermined display dot number of a display screen (i.e., a source image has been divided by a fundamental unit which has been previously defined by the display dot number of the screen of the display apparatus) image data of each of subdivided partial images are compressed (coded). Simultaneously, either position information or address information of the partial image containing a distinguishing feature of the input image is extracted based on each of the partial image thus divided, and the position or address information is stored together with compressed data into a recording medium such as an optical disk. Thereafter, during the retrieving operation, the position information stored in the recording medium is referred to thereby to read image data of only the featured partial image from the optical disk through expansion (decoding) of the relevant compressed data, and the read image data is successively displayed. With such an arrangement, an image data retrieval method and system are provided by which image data can be retrieved at high speed without requiring an extra file capacity such as a guide image filing capacity.

Furthermore, in a featured part extraction according to an aspect of the present invention, plural items of the featured partial images are set or selected from the respective partial images which have been divided when the source image is divided. For example, index information of a featured partial image is formed and prepared in a recording medium or a retrieving memory. The index information involves either a portion existing at a specific position of a source image, or a portion to which specific information has been described as present in the divided partial image. Then, during the retrieving operation, while referring to the prepared index information, only compressed data on an image of an arbitrary item of the featured partial image among the above-mentioned plural items of the featured partial images is read out from the recording medium, and expanded (decoded) into image data to be displayed on a display screen.

On the other hand, in a featured part extraction according to another aspect of the present invention, complexity is determined with respect to a divided partial image based upon a binary change of an image pattern, namely an alternation number from white to black, or black to white. A region (image) having the highest complexity with the greatest alternation number can be set as a most featured region (image). Also, the most featured region is set to a first page among a plurality of divided regions constituting an input image, i.e., at a head display order, and stored in the recording medium. During the retrieving operation, only the first page corresponding to the featured partial image of the respective drawings is read out from the reading medium, and expanded into image data. Thus, the expanded image data can be successively displayed on the display screen.

A description will now be made of one operation mode of the image data retrieving method and system according to the present invention. First, when an image having a large size such as A0 and A1 size is inputted for filing purposes, the input image is divided by a fundamental unit defined by the screen size of the display screen. Image data representing the respective divided partial images is compressed. At the same time, position information of the partial image properly indicative of a feature of the source image among the divided partial images is automatically extracted and stored, together with compressed data of the partial image, into the optical disk as the recording medium. Subsequently, when the file is retrieved, only the partial image properly indicating the feature of the source image among the respective partial images which have been divided and stored, is read out from the optical disk based upon the above-mentioned position information, and expanded into image data to be displayed.

Accordingly, since a portion for representing most properly the feature of the source image, such as the most complex portion of the source image, a portion located at a specific position of the source image, or a portion on which specific information has been described, is displayed, an operator can specify the source image so that the image retrieving operation effected by displaying only a portion of the source image can be realized.

Further, in the case where the source image cannot be specified by the first featured partial image, it is required to observe a partial image other than the featured partial image of the source image. However, also in this case, all of the source image data need not be read out from the optical disk and need be expanded. While the display priority orders corresponding to the feature degrees are applied to the respective partial image, other partial images can be merely, sequentially read and expanded. As a consequence, time required for reading and expanding is shortened. Thus, the time required from a retrieval instruction by an operator until generation of a display is reduced. The above-mentioned operation will now be described with reference to a concrete example. For instance, it is assumed that a source image having an A0 size has been divided into 16 partial images each having an A4 size, and each partial image is compressed and stored into an optical disk. Thus, in the case where a partial image other than the featured partial image is to be observed, it is not necessary to read all of the compressed data of the stored source image from the optical disk, but only compressed data for one of the divided partial images may be read and expanded into image data. As a result, the time required for the data expansion is reduced to 1/16, as compared with the time required for expanding all of the image data of the source image having the A0 size. Consequently, the time required for displaying a partial image is shortened and the man-machine interface is improved.

In accordance with the present invention, while images convenient to the user are sequentially displayed at high speed, the retrieving operation can be realized through the contents of the displayed images.

BRIEF DESCRIPTION OF THE DRAWINGS

FIG. 5 is a block diagram of a further embodiment of the present invention;

DESCRIPTION OF THE PREFERRED EMBODIMENTS

Referring now to accompanying drawings, embodiments according to the present invention will be described.

Figure 1:
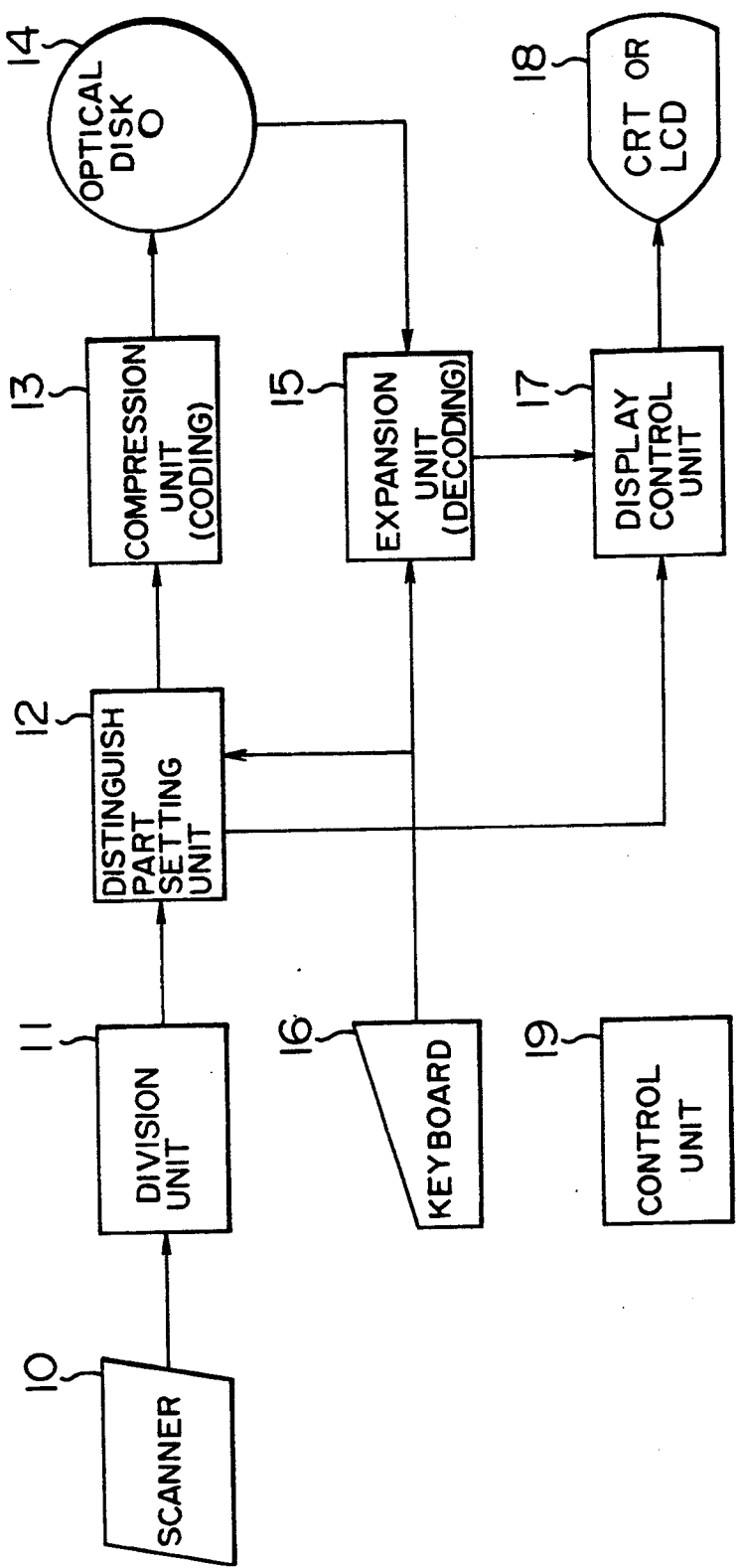
FIG. 1 is a block diagram for representing an embodiment of the present invention.

FIG. 1 shows a block diagram of an image data filing system according to an embodiment of the present invention. Reference numeral 10 denotes an image input unit, such as a scanner, for inputting image data, numeral 11 denotes a division unit for dividing the input image data into fundamental units, numeral 12 denotes a distinguishing (featured) part setting unit, numeral 13 denotes a compression (coding) unit for converting the divided image data into compressed data, numeral 14 denotes an optical disk into which the images have been stored in a compressed data form, numeral 15 denotes an expansion (decoding) unit for converting the compressed data derived from the recording medium into image data, numeral 16 denotes an input device including a keyboard and a pointing device, for inputting a command and the like, numeral 17 denotes a display controller, numeral 18 denotes a display device such as CRT, for displaying the image, and, numeral 19 denotes a control unit for providing control of various processes of the overall system. It should be noted that the division unit 11 may be realized by employing a well known circuit, such as that disclosed in, for example, JP-A-60-163169 (published on Aug. 26, 1985) and JP-A-60-77271 (published on May 1, 1985).

Figure 2:
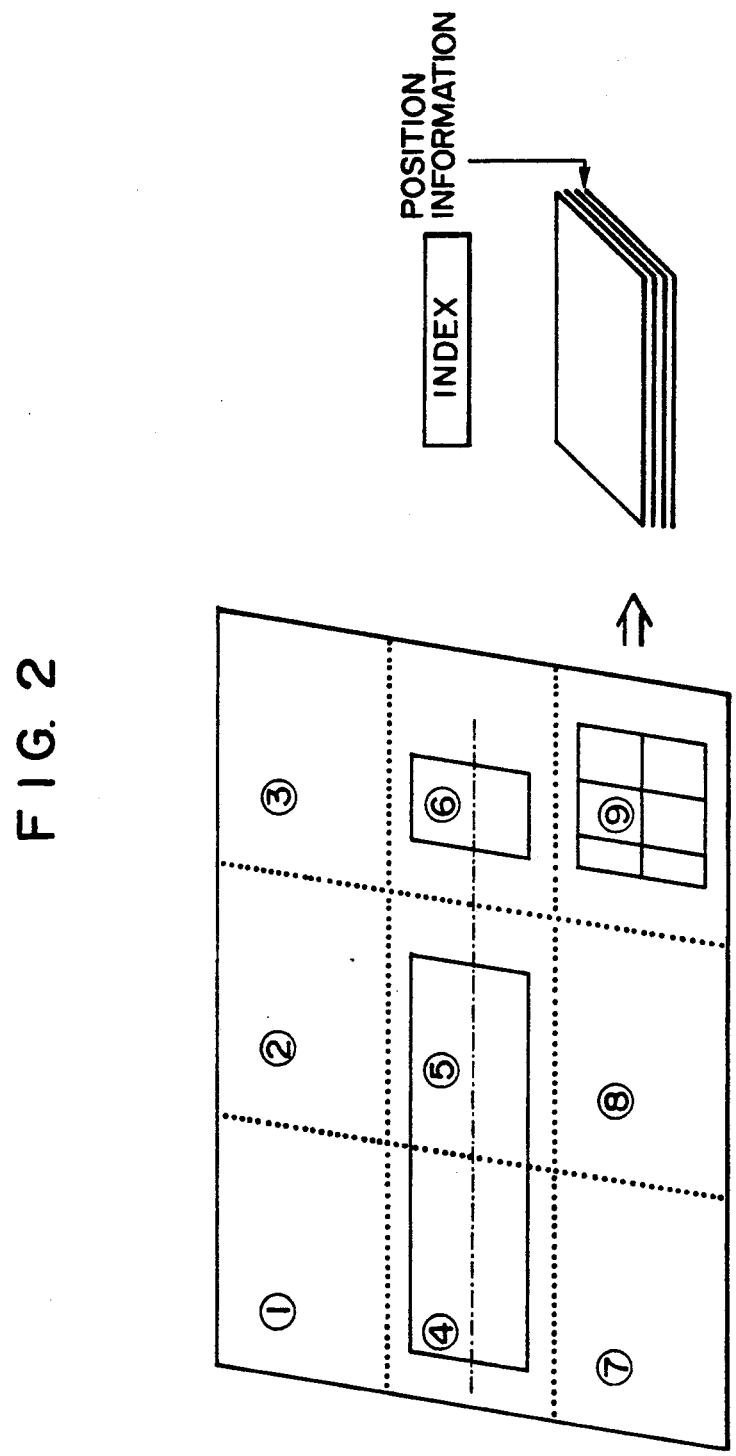
FIG. 2 is an illustration for explaining an operation of a divisional file system in FIG. 1.

In FIG. 2, there is shown an illustration of an input image, for explaining the division filing method performed by the system of FIG. 1. It should be noted in FIG. 2 that reference numerals surrounded by circles indicate partial images which have been divided.

First, a registration sequence of input images will now be described. It is assumed that an image having a large size, such as an A0 size, or an A1 size, has been inputted by the scanner 10. Subsequently, the input image is divided based upon the screen size of CRT 18. For example, as previously described, if a CRT display screen has a resolution of 200 DPI, or approximately 1700×2400 dots, an A4-sized image corresponds to a unit partial image. Assuming now that the input image is divided into partial images ①to ⑨, as represented in FIG. 2, an index representative of the presence of a partial image for properly indicating plural featured items of a source image among the divided partial images is formed in the distinguishing part setting unit 12. For instance, it is assumed that as the featured items, a designation is made to a central portion of a source image, and particulars of figure numbers, titles and the like in a design drawing so that the index is formed. For example, the portion ⑤ shown in FIG. 2 is registered as a central portion in an index register unit (referred to as an "index unit"), the portion ⑨ is registered in the index unit as a portion of particulars, and it is indicated where each of the portions is located on which sheet of the entire source image. It should be noted that this registration operation may be performed by the automatic registration means in the distinguishing part setting unit 12, or by a manual registration while an operator inputs data. As this manual registration means, for instance, the divided image data is sent to the CRT control unit 17 and displayed on the CRT 18, so that while an operator observes each partial image displayed on CRT 18, he instructs the input device 16 to register them.

Then, to store as many images with a limited file capacity, partial image data is converted into compressed data in the compression unit 13 in such a manner that the image data of the respective partial images are compressed. In other words, the partial image data is developed into bit data. After the positions of the respective partial images have been registered in an index area within a recording format of image data, both the compressed data of the respective partial images and the index data are stored into the optical disk 14.

Next, a retrieving sequence of a image will be described. An operator selects partial images to be displayed as to a plurality of source images from the above-mentioned plural featured items of the partial images. For instance, when the central portion is selected to be retrieved, the expansion unit 15 first reads out the index data from the optical disk 14. In accordance with the read index data, only the central partial image of the source image is read and expanded into image data. The expanded image data is transferred to the CRT control unit 17 and then displayed on CRT 18.

In the above descriptions, control signals are supplied from the control unit 19 to the respective circuit elements, and signals for reporting conditions of the respective circuit elements are furnished to the control unit 19. However, since such descriptions are not necessarily required for a better understanding of the present invention, these descriptions and illustrations are omitted for the sake of simplicity.

Figure 3:
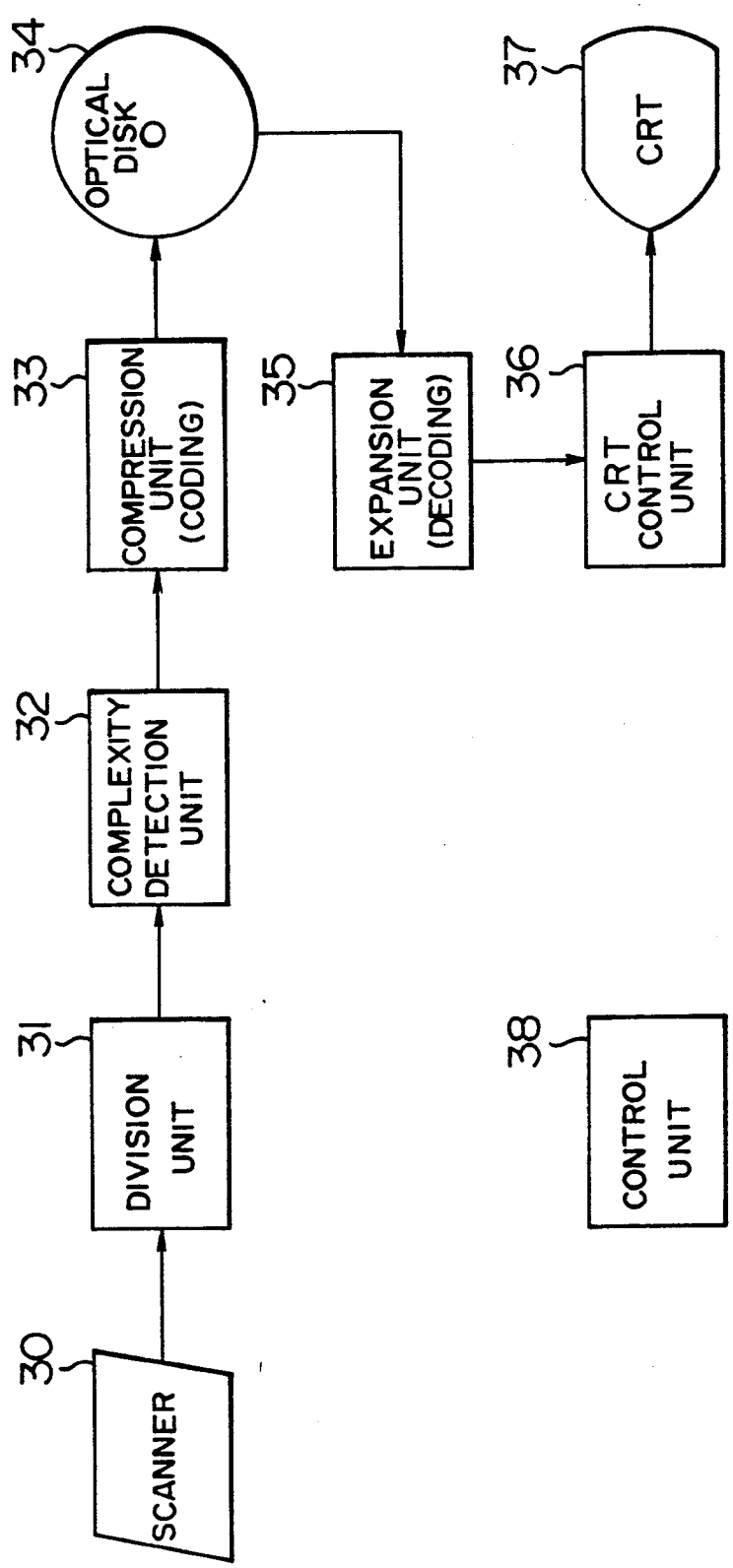
FIG. 3 is a block diagram for indicating another embodiment of the present invention.

FIG. 3 is a block diagram of another embodiment of the present invention. Reference numeral 30 denotes a scanner unit, numeral 31 denotes a division unit, numeral 32 denotes a complexity detection unit for measuring the complexities of the respective divided partial images, numeral 33 denotes a compression unit, numeral 34 denotes an optical disk, numeral 35 denotes an expansion unit, numeral 36 denotes a CRT control unit, numeral 37 denotes a CRT, and numeral 38 denotes a control unit.

In accordance with the embodiment, there is a particular feature that instead of forming the index data, partial images for properly representing the feature are combined into a specific page and set.

A description will now be made of an image recording sequence according to the embodiment. Image data of an image inputted by the scanner 30 is divided by a fundamental unit in the division unit 31 in a manner similar to that of the first embodiment. Subsequently, the image data of the respective partial images which have been divided are scanned in the complexity detection unit 32 in an X-axis direction and a Y-axis direction. That is to say, the image data is vector-scanned so as to measure the number of changing points. In other words, the complexity of the image is measured by counting frequencies of changes from white to black, or from black to white. Thereafter, the image data of the respective partial images is compressed so as to produce compressed data in the compression unit 33. Then, the partial image having the highest complexity among a plurality of partial images divided from the respective source images is stored into the optical disk 34 in such a manner that the first-mentioned partial image is located at a first page of these entire partial images, i.e., a head store position.

Subsequently, an image retrieving sequence will now be described. At first, compressed data relating only to the first page corresponding to the featured portion of each of the images are successively read out from the optical disk 34, and then converted into image data in the expansion unit 35. The converted image data is delivered to the CRT control unit 36 and displayed on CRT 37.

Also, in the above explanations, control signals are supplied from the control unit 38 to the respective circuit elements, whereas signals for announcing conditions of these circuit elements are furnished to the control unit 38, similar to those of the first embodiment shown in FIG. 1.

Figure 4:
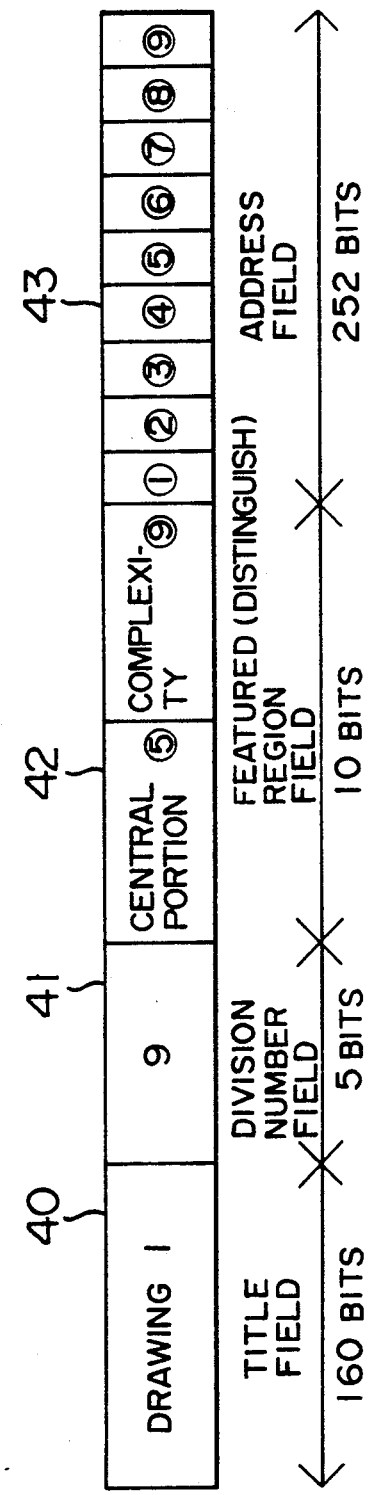
FIG. 4 is an illustration of an index format employed in another embodiment.

Referring now to FIG. 4, a division filing method of image data according to a embodiment will be described. In this filing method, when an input image is larger than a display screen, after the input image has been divided by a basic unit, the divided images are compressed and simultaneously position information of a partial image indicative of a particular feature of a source image is extracted, and further stored together with the compressed data of the image.

First, an index format of each source image, as represented in FIG. 4, is formed. Here, a data field 40 is a title unit for registering a title of an image to be stored, a field 41 is a divisional number unit for registering a divisional number, a field 42 corresponds to a distinguishable region unit for indicating which partial image properly represents a feature of a source image, and a field 43 denotes an address unit for registering an address of each partial image on an optical disk.

As to the field 42, a plurality of items to define a distinguishable partial image are previously determined. For instance, it is assumed that a set has been made to both a central portion of the source image and a second item of the distinguishable partial image having the highest complexity.

Thus, an index represented as a concrete example is formed. At first, titles of input images can be registered up to 10 characters. In case of 10 characters, 160 bits (=16(2 bytes)×10) are allocated to KANJI characters, whereas 80 bits (=8(1 byte)×10) are allocated to alphanumeric characters. Accordingly, the title unit 40 requires 160 bits (=16(2 bytes)×10). Then, assuming that the division pages for the input image are 31 at a maximum page, the divisional number unit 41 requires 5 bits. Next, it can be registered in the distinguishing part setting unit 42 that the respective items of the featured partial image are present in a page of an entire source image. Since the input image is divided in 31 pages at the maximum, 5 bits are required for each item. Now, as two items have been set, the distinguishing part setting unit requires 10 bits. Then, while the compressed data of the respective partial images are stored in the optical disk, the positional addresses to record the respective partial images are registered in the address unit 43.

In general, a memory capacity of a 5-inch optical disk is approximately 0.6 G bytes. If a sector functioning as a minimum data unit is selected to be 40 K bytes, there are provided about 1,500 sectors in this optical disk. As a result, each address to access this optical disk requires 14 bits. Since both a head address and an end address of a position where compressed data of each image is recorded need to be registered, 28 bits are necessary for each of the partial images. Accordingly, as represented in FIG. 2, when an input image is divided by 9, the address unit 43 requires 252 bits (=28×9).

Therefore, an index length of this input image becomes 427 bits in total.

Next, a concrete registration procedure of an image will now be described. When an image is first inputted, a title of the input image is registered in the title unit 40. Subsequently, the input image is divided based upon a fundamental unit defined by a screen size of a display device. Now assuming that, as represented in FIG. 2, the input image has been subdivided into 9 partial images ① to ⑨, the division number 9 is registered into the division number unit 41. Thereafter, a partial image properly indicative of a feature (distinguishable part) of a source image among the respective partial images is registered in the distinguishing part setting unit 42 of the index. In FIG. 2, for example, the partial image ⑤ corresponding to the central portion of the source image is registered as a central portion, whereas the partial image ⑨ corresponding to the portion having the highest complexity is registered as a portion having a high complexity. Then, the image data of each partial image is compressed. While, the compressed data of the respective divided partial images are stored into the optical disk, both the head address and end address of the position where the respective partial images are stored are registered in the address unit 43. Finally, the thus formed indexes of format are stored together with the compressed data of the respective partial images into the optical disk.

During the retrieving operation, when an operator designates that a partial image is to be displayed among the plural featured items of the partial images, the expansion unit judges which portion corresponds to the designated featured partial image with reference to the distinguishing part setting unit 42 of the index for each image stored in the optical disk. Only such judged partial image is read out from the optical disk, while referring to the address unit 41 of the index, and displayed on CRT via the CRT control unit.

In FIG. 5, there is shown another embodiment of the present invention in which the filing system represented in FIG. 1 is combined with a CAD system.

In accordance with the embodiment, in a CAD system where a coordinate is inputted so as to form a vectored drawing, vector data of the formed drawing is converted into image data, and the converted image data is stored into an optical disk, when the formed drawing is greater than a display screen, after the converted image data has been divided by a fundamental unit, the divided image data is compressed. During the retrieving operation, only the featured (distinguishable) partial images are continuously displayed.

In FIG. 5, reference numeral 50 denotes a vectored drawing generation unit, numeral 51 denotes a vector/raster translator unit (graphic display processor GDP), numeral 52 denotes a division unit, numeral 53 denotes a distinguishing part setting unit, numeral 54 denotes a compression unit, numeral 55 denotes an optical disk, numeral 56 denotes an expansion unit, numeral 57 denotes a keyboard for inputting a coordinate and a command or the like used to form a drawing, numeral 58 denotes a CRT control unit, numeral 59 denotes a CRT, and numeral 510 denotes a control unit. The blocks 50 and 51 correspond to construction elements for the CAD system. These blocks may be constructed of, for instance, "Engineering Work Station Type 2050G" manufactured by Hitachi, Ltd and "graphic controller LSI type TMS 34010" manufactured by Texas Instruments Inc. In the embodiments, the remaining circuit arrangements other than these blocks 50 and 51 are similar to those of FIG. 1.

An operation will now be described. A vectored drawing is generated by a coordinate inputted by the keyboard 57 in the vector generation unit 50. Subsequently, vector data of the generated drawing is converted into image data in the vector/raster translator unit 51. In the case where the generated drawing is larger than the screen of the display device, the image data of the converted drawing is divided by a fundamental unit in the division unit 52. Then, an index representative of a location of a featured (distinguishable) part among the divided partial images is produced in the distinguishing part setting unit 53. A registration is carried out in an index unit such that either, for instance, a central partial image of a source image, or another partial image where a title and the like have been described, as the distinguishable part, is located at a certain page of all source images.

Then, to compress the image data of the respective divided partial images, this image data is converted into compressed data in the compression unit 54, and the compressed data is stored in the optical disk 55.

When the retrieving operation is carried out, an operation selects a form to be displayed from the above-mentioned several sorts of partial images, and inputs the selected form by way of the keyboard 57. When, for instance, the central portion is selected, the expansion unit 56 first reads out the index from the optical disk 55. Subsequently, in accordance with the read index, only the central partial image of the source image is read and expanded into image data. The expanded image data is sent to the CRT control unit 58 so as to be displayed on CRT 59.

Also, it should be noted in the above descriptions that control signals are supplied from the control unit 510 to the various circuit elements and signals for announcing conditions of the various circuit elements are given to the control unit 510, similar to those of the first embodiment shown in FIG. 1.

Figure 6A:
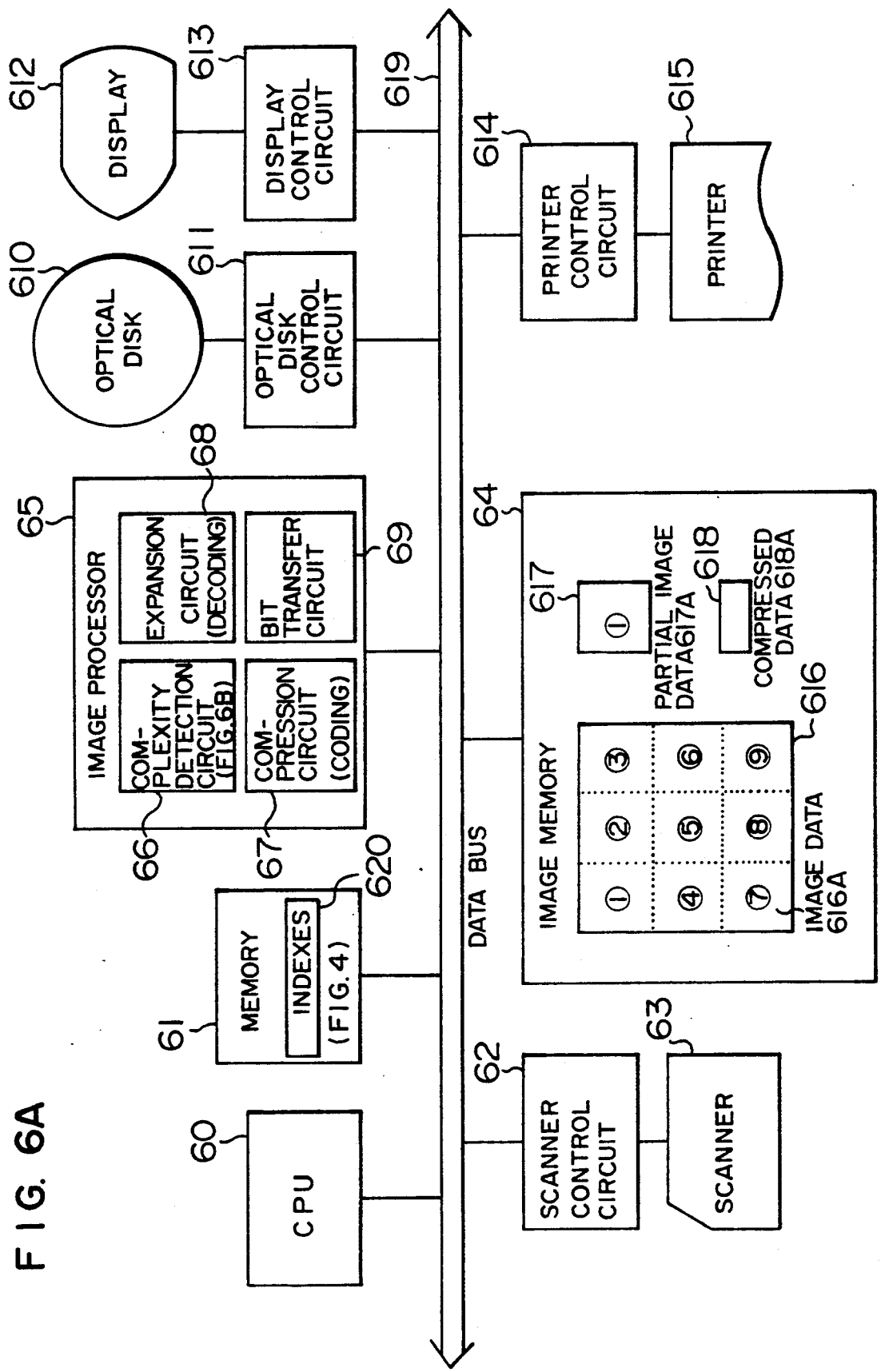
FIG. 6A is a diagram for representing an arrangement of a further embodiment.

A further embodiment of the present invention will now be described with reference to drawings. FIG. 6A represents an arrangement of a fifth embodiment according to the present invention. It should be understood that the fifth embodiment has introduced an idea of a programming control with a higher potential than in the previous embodiments. In the arrangement shown in FIG. 6, reference numeral 60 denotes a central processing unit (referred to as a "CPU") for controlling an overall apparatus, numeral 61 denotes a memory for previously storing a program to control CPU 60, and also a produced index, numeral 62 denotes a scanner control circuit for generating a drive signal and for transferring image data, numeral 63 denotes a known-type scanner for converting into electric image data, an image including a character and a graph to be recorded, which has been formed on a medium such as paper. Furthermore, reference numeral 64 denotes an image memory for storing image data which has been inputted by the scanner 64, numeral 65 denotes an image processor for processing image data stored in the image memory, numeral 66 denotes a complexity detection circuit for detecting a complexity of an image, numeral 67 denotes a compression circuit for converting image data into compressed data, numeral 68 denotes an expansion circuit for converting the compressed data into image data, and numeral 69 denotes a bit transfer circuit for extracting the image data stored in the image memory 64 at a bit unit. It should be noted that the above-mentioned compression circuit 67, expansion circuit 68 and bit transfer circuit 69 may be, for example the, "Compression Expansion Processor Type Am 7971" manufactured by Advanced Micro Devices, Inc. In addition, reference numeral 610 denotes an optical disk control circuit for producing a drive signal and for controlling input/output operations of the compressed data into/from the optical disk, reference numeral 612 denotes a display such as CRT, for displaying the image data, numeral 613 denotes a display control circuit for generating a synchronization (sync) signal, and for transferring the sync signal together with the image data to the display 612, numeral 614 denotes a printer control circuit for generating a drive signal, and for transferring the image data, and numeral 615 denotes a printer for printing the image data on paper. Moreover, reference numeral 616 denotes a store region of image data 616A inputted by the scanner 63, numeral 617 denotes a store region of partial image data 617A which has been extracted from the input image 616a based upon a size of a partial image to be divided, numeral 618 denotes a store region of compressed data which has been produced by compressing the partial image data 618A of the store region 616, numeral 619 denotes a data bus for performing data exchanges among each unit and devices, and numeral 620 denotes a memory for constituting an index unit representative of a position of a distinguishable partial image.

Figure 6B:
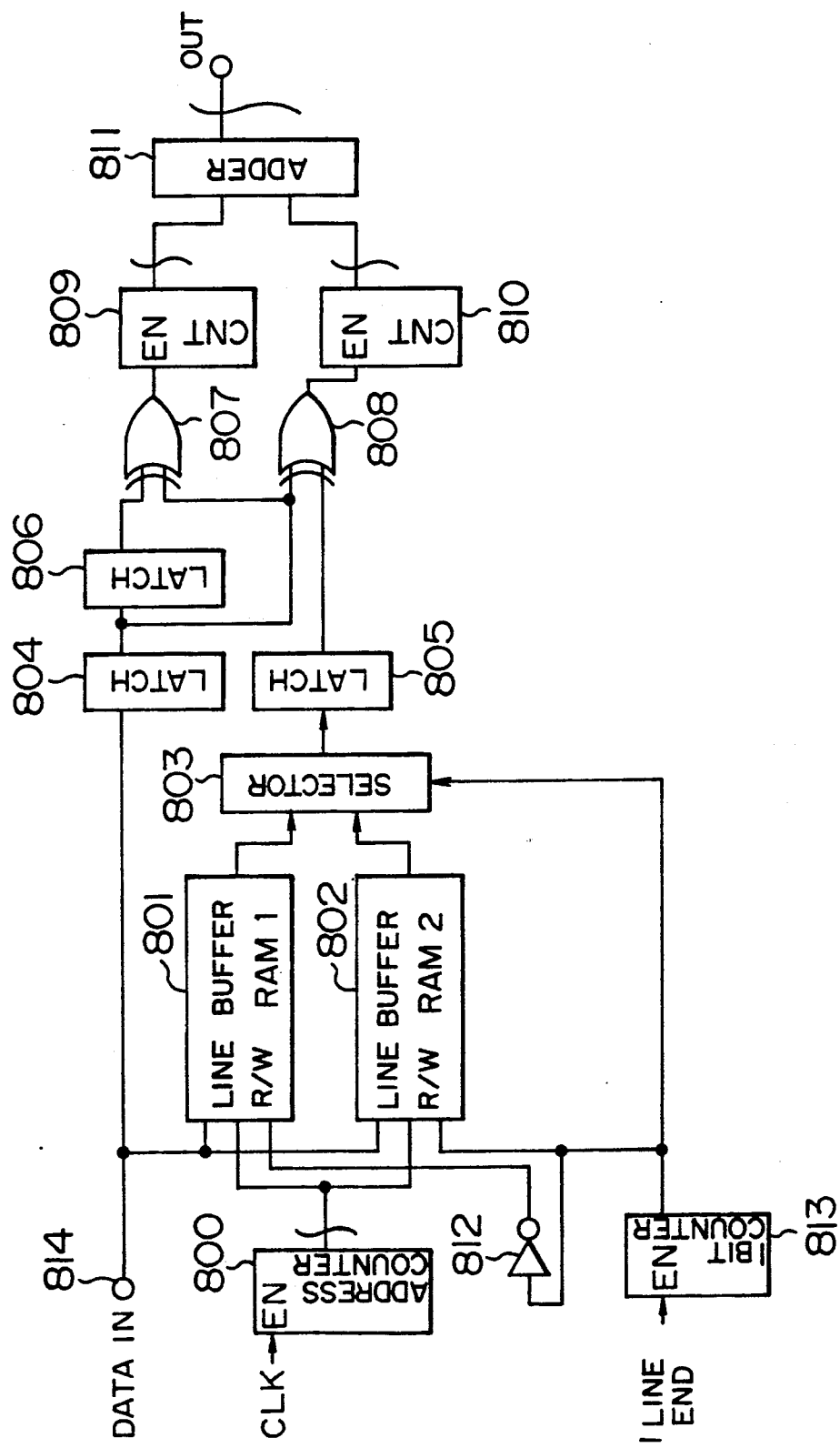
FIG. 6B is a block circuit diagram for representing a concrete example of the complexity counting circuit shown in FIG. 6A.

In FIG. 6B, there is shown a concrete circuit arrangement of the complexity detection circuit 66 represented in FIG. 6A.

It should be noted that image data to be handled in the embodiment, corresponds to binary image data for indicating that white is "0" and black is "1". The image data of the respective partial images is inputted at one dot unit every line in response to clocks. The input image data is successively latched by flip-flops 804 and 806. In the case where adjoining pixels of the image data which have been latched by the flip-flops 804 and 805 are different from each other, an output of an exclusive-OR (EOR) circuit 807 becomes "1" so that a counter 809 is counted up. Thus, the counter 809 counts the number of changing points of the pixels in the horizontal direction. When the image data inputted from an input terminal 814 is latched by the latch 804, at the same time, this image data is written into either a line buffer RAM-1 801, or another line buffer RAM-2 802. At this time, an address is followed by an instruction of an address counter 800 which is counted up in response to the above-mentioned clock. In the other line buffer RAM, the image data on 1 line has been previously written. The image data of this 1 line stored in the other line buffer RAM is read out in synchronism with the image data inputted from the input terminal 814, so as to latch the flip-flop 805. In the case where the upper and lower pixels of the image data which have been latched by the flip-flops 804 and 805 are different from each other, the output derived from the exclusive-OR circuit 808 becomes "1". As a result, a counter 810 is counted up. Thus, this counter 810 counts the number of changing points of the pixels in the vertical direction. As previously described, once 1-line process is completed, an output signal from a 1-bit counter 813 is inverted so that the succeeding line process is executed after both the write process and read process are changed via a selector 803 with respect to the line buffer RAM-1 801 and line buffer RAM-2 802.

The number of the changing points in the horizontal direction is added in an adder 811 to the number of the changing points in the vertical direction. These numbers have been counted by the above-described processes. As a consequence, the changing point numbers of the image from white to black, or from black to white can be counted.

Thus, the counted complexities of the respective partial images are stored into a memory 61, and these complexities of the respective partial images are compared with each other in CPU 60, so that the partial image having the highest complexity is determined.

Operations of the image data filing system represented in FIGS. 6A and 6B will now be described.

A description is made of a register sequence of an input image. First, the scanner control circuit 62 is energized by CPU 60 based on the program stored in the memory 61. The energized scanner control circuit 62 drives the scanner 63 so as to input the image data 616A. Then, the input image data 616A is stored via the scanner control circuit 62 and data bus 619 to the image memory 64.

At the same time, CPU 60 judges the size of the input image, to divide the input image when the size of the input image is larger than the screen size of the display device. Then, an index unit 620 is formed in the memory 61, which registers such information that a partial image properly representative of a feature (distinguishable part) of the source image is present in a page of the source images among the divided partial images.

Thereafter, CPU 60 initializes the image processor 65. In the initialized image processor 65, the image data 616A is inputted into the complexity detection circuit 66 which has been described in detail with reference to FIG. 6B. In this circuit 66, the changing point numbers of the images from white to black, or from black to white are counted with respect to the respective divided partial images. As a result of this counting operation, the complexities of the respective partial images are detected. Under the control of CPU 60, the index information for representing that the partial image having the highest complexity is present at a page, is registered in the index unit 620.

Subsequently, CPU 60 initializes the image processor 65. The bit transfer circuit 69 extracts the partial image data 617A to a different region 617 of the image memory 64 at each bit every time the image data 616A is divided into the partial images. Then, the partial image data 617A is inputted into the compression circuit 67 and the compressed data 618A is formed in another region 618 of the image memory 64 and stored therein. Next, CPU 60 energizes the optical disk control circuit 611. The compressed data 618A of the respective partial images are inputted into the optical disk control circuit 611, and stored into the optical disk 610 of the recording medium.

In this case, CPU 60 records the address of the position on the recording medium in which the compressed data 618 of the respective partial images are stored in the index unit (region) of the memory 61.

When the addresses of all of the partial images have been stored in the memory 61, CPU 60 finally energizes the optical disk control circuit 611. The index information of the memory 61 is stored via the optical disk control circuit 611 into the optical disk 610.

A procedure of the retrieving operation according to the present invention will now be described. Based upon the system program (OS) stored in the memory 61, the optical disk control circuit 611 is initialized by CPU 60. The initialized optical disk control circuit 611 reads out the index 620 of the images stored in the optical disk 610 therefrom. In accordance with the read index unit 620, CPU 60 energizes the optical disk control circuit 611 so as to read only the compressed data 618A' of the distinguishable partial image of each image from the optical disk 610 and store the read compressed data in the image memory 64. Subsequently, CPU 60 energizes the image processor 65. Thus, the read compressed data is inputted into the expansion unit 69 so as to be converted into image data. Then, the converted image data is inputted into the display control circuit 613 and displayed on the display 612. As previously described, the retrieving operation is performed in such a manner that the distinguishable partial images of the respective images are successively displayed. Either the entire image, or partial images are printed out via the printer control circuit 614 by the printer 615, if required.

Figure 7:
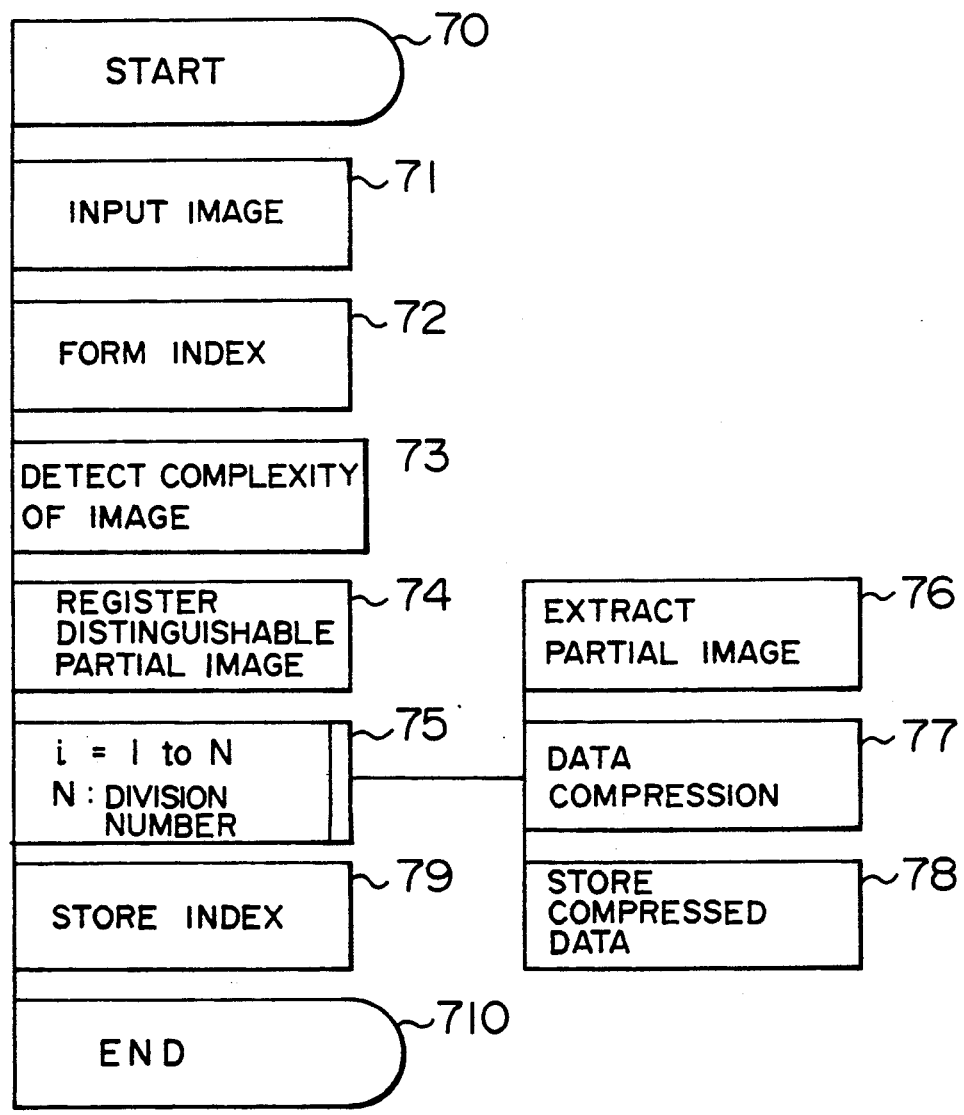
FIG. 7 is a Problem Analysis Diagram (PAD) for representing a process sequence employed in the embodiment shown in FIG. 6A.

The above-mentioned method for dividing the image and for compressing the divided images so as to be stored will now be described in detail. FIG. 7 illustrates a problem analysis diagram (PAD) for representing a concrete process sequence of this method.

In FIG. 7, a start of an image division store process is announced at a block 70. At a block 71, an image is inputted. At a block 72, a register index is formed which represents that a partial image properly indicative of a feature (distinguishable part) of a source image among the divided respective partial images is located at a page of these partial images at a block 72. Subsequently, at a block 73, the complexities of the respective partial images of the image data are detected by employing the complexity detection circuit 66. At a next block 74, index information indicating in which page the partial image having the highest complexity is present, is registered in the index unit 620. In accordance with the above-mentioned process sequence, the operation for dividing the image so as to be compressed is repeated at a time equal to the division number, at a block 75. The source image is extracted in a data form of a bit unit with respect to each partial image to be divided at a block 76. Thereafter, the extracted source image is converted into compressed data by utilizing the compression circuit 67 at a block 77. The produced compressed data is stored into the optical disk at a block 78. At this time, the address of the position where the compressed data is stored is registered in the index unit 620. The above-mentioned processes defined from the block 76 to the block 77 are repeated at a time equal to the number of the divided partial images. Thus, when all of the partial images have been stored in the optical disk, the index information which has been stored in the index unit is stored in the optical disk per se at a block 79. At a subsequent block 710, an announcement is made to indicate an end of the image store process.

In accordance with the above-mentioned embodiment, such a convenient-to-use and high-speed retrieving method can be realized in that only the partial images having the features of the source images are successively displayed, and the contents thereof are retrieved.

Figure 8:
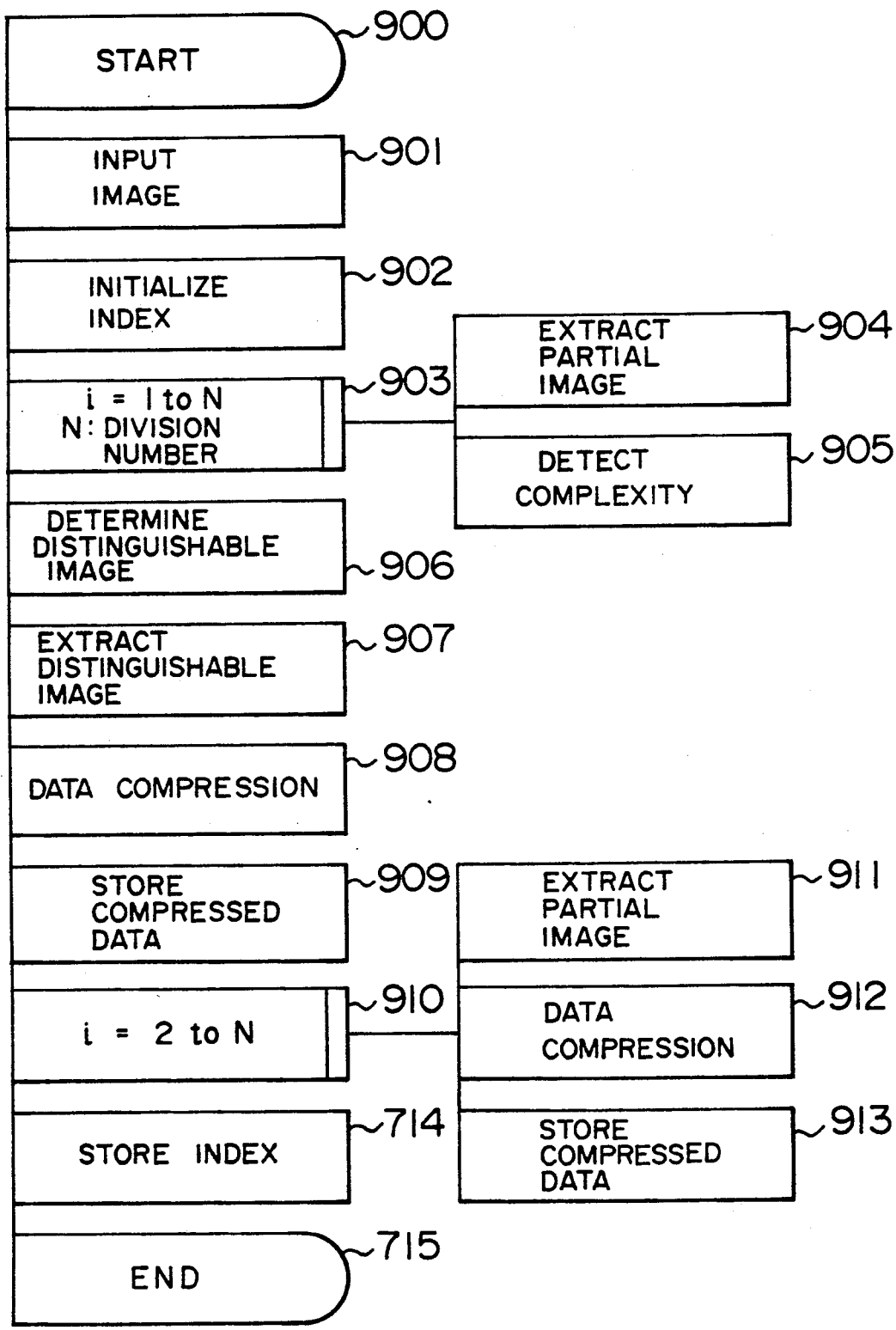
FIG. 8 is a diagram for indicating a process sequence so as to explain a still further embodiment of the present invention; and, FIG. 9 is an index format diagram employed in a registration sequence utilized in the embodiment represented in FIG. 8.
Figure 9:
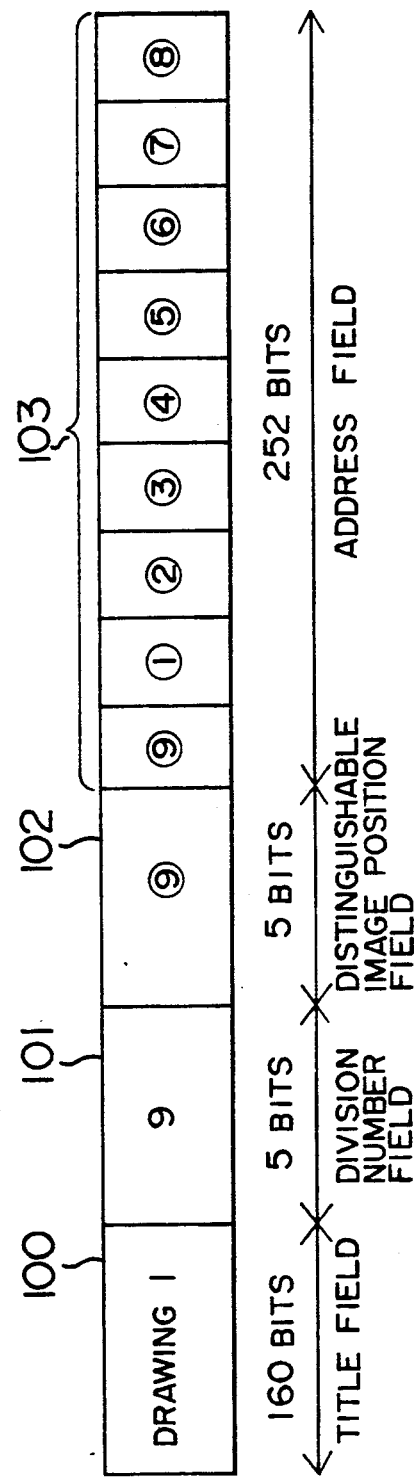

Referring now to FIGS. 8 and 9, a retrieving method according to a further embodiment of the present invention will be described. In the embodiment, a partial image having a distinguishable part among a plurality of partial images divided from an input image is set to a first page of a partial image to be paged so as to be compressed, and only a first page of each image is expanded in order to be displayed during a retrieving operation.

In FIG. 8, an index registration sequence for realizing the retrieving method according to the above embodiment is represented in a PAD form. At a block 901 of FIG. 8, an image is inputted by utilizing the scanner and is developed into image data. At a block 902, an index unit is initialized to register index information for representing in which part of the entire source image, either the address of each partial image, or the distinguishable partial image set at the first page is located. In blocks 903 to 906, the image data stored in the image memory is extracted at the unit of the partial image, the complexity of each partial image is detected, and the partial image having the highest complexity is determined as the featured (distinguishable) image. At blocks 907 to 909, the determined distinguishable image is extracted, and compressed so as to be stored into the optical disk. At blocks 910 to 913, the remaining images are also sequentially extracted in the units of the partial image, and the extracted images are compressed so as to be stored in the optical disk. The position information with respect to the entire distinguishable images is written into the index unit, and thereafter the position information of the index unit is stored into the optical disk.

A format of the above-mentioned index unit utilized in the embodiment shown in FIG. 8 is represented in FIG. 9. In the format of FIG. 9, a field 100 represents a title part for registering a title of a drawing, and has an area of 10 KANJI characters, i.e., 160 bits (=16×10). In case of 10 characters, 160 bits (162 bytes)×10 are allocated to KANJI characters, whereas 80 bits (8(1 byte)×10) are allocated to alphanumeric characters. A field 101 corresponds to a division number part for registering a division number by which a source image is divided, and to a bit area capable of displaying 31 pages at maximum. A field 102 indicates a bit area of information representing such a positional relationship that the partial image set to the first page corresponds to which part of the source image. A field 103 is an address part for registering both a head address and an end address of each partial image. For instance, when the address is 14 bits, and the head and end addresses are 28 bits, a total bit is equal to 252 bits (=28×9).

In all of the embodiments, in case that a source image cannot be specified by merely observing a distinguishable partial image, the source image can be specified by sequentially displaying other partial images.

Also, in the first embodiment shown in FIG. 1, the fundamental unit of the image division is selected to be the screen size of CRT 17. However, this fundamental unit is not limited thereto, but may be selected to other sizes.

Furthermore, in the second embodiment shown in FIG. 3, when the distinguishable partial image among the divided partial images is set, the complexity degrees of these images are utilized, but are not restricted thereto and may be realized by way of other means. For example, either the part of the source image positioned at the specific position, or the part to which the specific information has been described may be set as the distinguishable partial image, which is similar to the first embodiment shown in FIG. 1.

Furthermore, in the second embodiment shown in FIG. 3, third embodiment shown in FIG. 4, or the fourth embodiment shown in FIG. 5, the fundamental unit of the image division may be selected to be the screen size of CRT 38, similar to the first embodiment shown in FIG. 1.

When the distinguishable partial image is set in the second embodiment shown in FIG. 3, or the fourth embodiment shown in FIG. 5, the complexity degrees of the images may be utilized, which is similar to the first embodiment shown in FIG. 1.

Although the index is stored together with the compressed data of the image into the optical disk in either the first embodiment of FIG. 1, or the third embodiment of FIG. 4, alternatively, an index file may be formed independent from the compressed data and the index may be stored into this index file. Then, during the retrieving operation, the indexes of the respective images may be read out from the index file, and only the distinguishable partial image may be read from the optical disk where the images have been stored while referring to the read indexes, and then the read partial image may be displayed.

In the first embodiment shown in FIG. 1, or fourth embodiment shown in FIG. 5, the index representative of the presence of the distinguishable partial image is not limited only to the index employed in the third embodiment shown in FIG. 4, but may be formed in other index forms.

The arrangements according to the first to fourth embodiments as represented in FIGS. 1 through 5 may be realized by way of an arrangement similar to that of the fifth embodiment shown in FIG. 6.

Moreover, although the partial images are stored into the optical disk every time the partial image is compressed in the embodiment shown in FIGS. 6 and 7, the compressed data of the respective partial images are stored in the image memory and finally all of the stored compressed data may be stored in the optical disk at one time.

What is claimed is:
1. In an image filing system including image input process means for inputting image data representing an image to be processed, store means for storing the image data input by said input process means, retrieval means for retrieving image data stored in said store means, and a display having a predetermined display dot number for displaying image data retrieved by said retrieval means, a method of filing images data comprising the steps of:

dividing image data representing an input image having a dot number larger than said predetermined display dot number into a plurality of partial images, representing in combination the entirety of said input image, at a fundamental unit equal to said predetermined display dot number;

producing compressed data by compressing each of the divided partial images;

predetermining position information of a distinguishable partial image among all of the divided partial images; and storing said position information together with said compressed data of said divided partial images into said store means.

2. An image filing method according to claim 1, further comprising:

an image retrieval step of reading out image data relating only to said distinguishable partial images from said store means, while referring to said position information stored in said store means or said input process means through said retrieval means, and for expanding said read image data so as to be displayed on said display means.

3. An image filing method according to claim 2, wherein said image retrieval step includes:

a step of outputting all of partial images constituting an image corresponding to the distinguishable partial image designated from the distinguishable partial images displayed on said display means.

4. An image filing method according to claim 1, wherein a selection is made to only one distinguishable partial image with respect to the respective input images.

5. An image filing method according to claim 1, further comprising:

a step of determining a complexity degree of the partial image representative of a changing point number of pixels per a unit area with respect to each of the partial images of the input image, and for identifying said partial image of each input image based upon said determining step.

6. An image filing method according to claim 1, further comprising:

a step of determining a partial image in which specific information is present, as the distinguishable partial image.

7. In an image filing system including image input process means for inputting image data representing an original image to be filed, store means for storing the image data input by said input process means, retrieval means for retrieving image data stored in said store means, a display having a predetermined display dot number for displaying image data retrieved by said retrieval means, a method of filing image data comprising the steps of:

dividing image data representing an input image having a dot number larger than said predetermined display dot number into a plurality of partial images, representing in combination the entirety of said input image, at a fundamental unit equal to said predetermined display dot number;

producing compressed data by comprising each of the divided partial images;

determining a distinguishable partial image from among the divided partial images; and storing the compressed data representing said determined distinguishable partial image into a specific store region of said store means and storing the compressed data of the remaining partial images into other store regions of said store means.

8. An image filing method according to claim 7, further comprising:

a retrieval step of expanding only the image data stored in said specific store region of the store means in response to a retrieval instruction so as to successively display the distinguishable partial images.

9. An image filing method according to claim 7, wherein said store means stores the partial images with respect to the respective images in such a manner that each of the partial images is allocated at a page unit, and allocates at least a head page of said distinguishable partial image as a specific store region.

10. An image filing method according to claim 9, wherein a plurality of said distinguishable partial images are provided with each of the images, and are sequentially allocated from said head page in accordance with a priority order.

11. An image filing retrieving system comprising:

an image data input device;

store means for storing image data representing an input image inputted by said input device;

retrieval means for retrieving the image data stored in said store means;

a display having a predetermined display dot number for displaying retrieved image data;

process means for performing a filing process on the input image data, said process means including means for dividing input image data having a display dot number larger than said predetermined display dot number into partial images, representing in combination the entirety of said input image, at a fundamental unit corresponding to said predetermined dot number, means for compressing said partial images so as to output compressed data, means for extracting position information of a distinguishable partial image from the respective divided partial images, and means for storing the extracted position information together with the compressed data for all of said partial images into said store means; and retrieval control means provided with the retrieval means, for reading out only data representing the distinguishable partial image among said divided partial images from said store means with reference to said position information in response to a retrieval instruction, for expanding the read partial image to produce image data, and for continuously display the partial image data on said display means.

12. An image filing retrieving system according to claim 11, wherein said fundamental unit to divide said image is equal to a screen size of said display screen.

13. An image filing retrieving system according to claim 11, wherein from the divided partial images, only one of said distinguishable partial images is set.

14. An image filing retrieving system according to claim 11, further comprising:

distinguishable partial image setting means for setting a distinguishable part to a specific page within the divided partial images instead of extracting the position information of said distinguishable partial image; and, means provided with said retrieval control means, for reading only the partial image of said specific page from said store means in response to a retrieval instruction, and for expanding the read partial image to obtain image data to be continuously displayed.

15. An image filing retrieving system according to claim 14, wherein said specific page corresponds to a first page of the divided partial images.

16. An image filing retrieving system according to claim 11, further comprising:

means for setting plural items of distinguishable partial images, and for expanding an arbitrary item of the partial image among said plural items of distinguishable partial images in response to a retrieval response so as to obtain image data to be displayed.

17. An image filing retrieving system according to claim 11, further comprising:

complexity determining means for determining a complexity of the image represented by a changing point number of pixels per a unit area with respect to each of the divided partial images in response to an instruction for setting a distinguishable partial image; and, means for identifying the distinguishable partial image based upon a result obtained by said complexity determining means.

18. An image filing retrieving system according to claim 16, further comprising:

means for setting a specific position of a source image to a distinguishable partial image.

19. An image filing retrieving system according to claim 16, further comprising:

means for setting a partial image into which specific information has been written, to a distinguishable partial image.

20. In an image filing system including an image data input device, store control means for storing the image data inputted by said input device into an optical disk, retrieval means for retrieving image data stored in said optical disk, and a display screen having a predetermined display dot number for displaying retrieved image data, a method of filing image data comprising the steps of:

dividing all of the input image data representing an input image into a plurality of partial images at said fundamental unit in response to an input of image data for an input image which is larger than said display screen can display at one time;

compressing each of the partial images and temporarily all of the partial images as compressed data;

extracting position information of a distinguishable partial image among the respective divided partial images; and storing the extracted position information together with the compressed data for all partial images into said optical disk.

21. A computer-aided-design (CAD) system for supervising a drawing comprising:

coordinate input means for inputting a coordinate;

vectored drawing generating means for generating a vectored drawing based upon the coordinate input by said coordinate input means;

vector/raster translator means for translating vector data of the drawing generated by said vectored drawing generating means into image data;

store means for storing an image of the drawing which has been translated into said image data;

retrieval means for retrieving said image stored into said store means;

a display screen having a predetermined display dot number for displaying said image;

printing means for printing out said image;

image dividing means for dividing the input image at a fundamental unit into partial images in response to the input image of the drawing larger than said display screen, and for compressing the partial images so as to be stored;

feature extracting means for extracting position information of a distinguishable (featured) partial image among the respective divided partial images;

means for storing said distinguishable partial image together with compressed data into said store means; and, retrieval control means provided with said retrieval means, for reading only a distinguishable part among said divided partial images from said store means with reference to said position information in response to a retrieval instruction, and for expanding the read distinguishable part to produce image data to be continuously displayed on said display screen.

* * * * *